Jan. 24, 1956  H. C. FLIND  2,731,691
WIRE TENSIONING DEVICE
Filed Jan. 10, 1951

Inventor
HERBERT CHARTERIS FLIND

By Frederick E. Hahn
Attorney

United States Patent Office 2,731,691
Patented Jan. 24, 1956

2,731,691

WIRE TENSIONING DEVICE

Herbert C. Flind, Eltham, London, England

Application January 10, 1951, Serial No. 205,251

Claims priority, application Great Britain January 10, 1950

10 Claims. (Cl. 24—71.2)

This invention relates to devices for applying tension to and taking up slack in flexible connections. There are many occasions when it is required to tauten flexible connections such as cords, ropes and wires. Among these may be mentioned specifically guy ropes of various kinds, the wire supporting tennis nets, fencing wire and so forth.

The usual method now employed is to apply the tension to the free end of the connection. In the case of ropes and cords this is usually effected manually by freeing one end of the connection and then anchoring it again after it has been tautened but in such conditions as tennis net supporting wires or fencing wires mechanical power amplifying means are provided to afford the necessary strain. The present invention differs from all earlier methods within my knowledge in that the tensioning is effected intermediate the ends of the connection, whatever form it may take, by a rotary, as distinct from a slidable operation such as is performed on the guy ropes of tents by means of sliding cleats. Thus, the invention in its broadest aspect consists of means for tensioning or taking up slack in a flexible connection fixed at its ends consisting of an appliance adapted to be applied to the connection intermediate its fixed ends and rotated so as to cause a loop to be formed and maintained in the connection.

In its preferred form the invention consists of means for tensioning or taking up slack in a flexible connection fixed at its ends consisting of an appliance adapted to be applied to the connection intermediate its fixed ends and rotated or twisted so as to cause a loop to be formed and wound on to an anchoring device temporarily carried by the tool but from which the tool is removable whereby the loop established by the tensioning operation is maintained by the anchoring device after the tool has been removed.

Devices for carrying out this method of tensioning can vary considerably but the preferred specific form of the invention involves the employment for producing the loop to apply the tension, of a device in the nature of an element having a progressive spiral or helical groove formed in its periphery or surface, in combination with some means for temporarily coupling the free end of the device to the connection so that the device is at an angle to the run of the connection being tautened.

Figure 3:
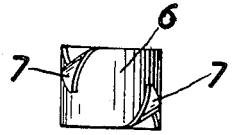
Figure 4:
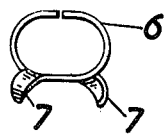

In order that the invention may be understood and carried into practice reference is hereby made to the accompanying diagrammatic drawings which show, by way of example, forms the invention may take and their method of use. In these drawings, Figure 1 is an elevational view of one form of tool, Figure 2 is an elevational view at right angles to Figure 1, Figures 3 and 4 are elevational and plan views of an accessory device for use with the tool, Figures 5, 6, 7 and 8 illustrate in successive stages the operation performed by this tool.

Figure 1:
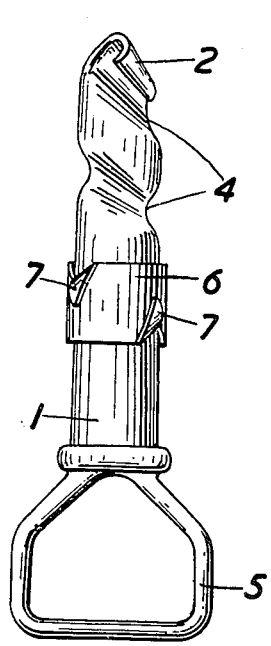
Figure 2:
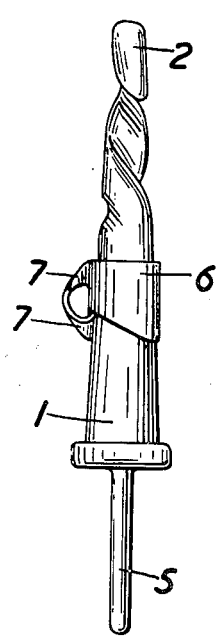

Referring particularly to Figures 1 and 2 it will be seen that the tool shown therein consists of a body member 1, which may be a casting or forging, having at its free end a turned over or undercut grooved tip 2 for enabling the tool to be temporarily coupled to the flexible connection 3. The groove of this tip merges into a spiral or helical groove 4 which proceeds along the body of the tool for some distance. The other end of the body 1 is provided with a handle 5. Reference should now be had to Figures 3 and 4 which show the anchoring device by means of which the loop formed in the connection by the operation of the tool is maintained, i. e. prevented from collapse when the tool is removed. This anchoring device consists of a ringlike structure 6 provided with oppositely directed hook like lugs 7 on one of its faces. This anchoring device must be of a dimension such as will permit its being easily slid over the forward part of the tool. It must be so dimensioned and of such a shape relative to the section of the tool at the part where it is to be located on the tool when in situ as will prevent it turning on the tool or becoming jammed and must be of sufficient rigidity as to withstand the pressure exerted on it by the loop aforesaid. One convenient section of the tool, at the part which accommodates the anchoring device with which the shape of the anchoring device which has to be slipped on to it corresponds, is elliptical.

Figure 5:
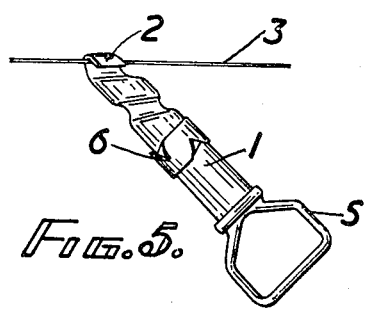
Figure 6:
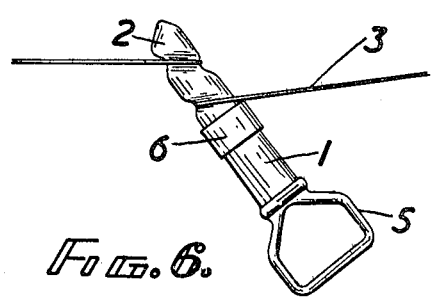
Figure 7:
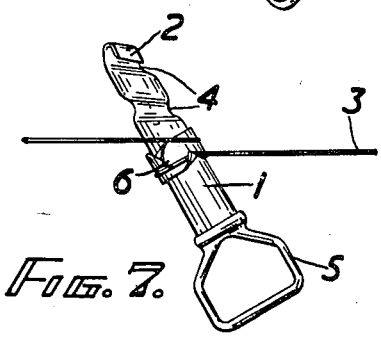
Figure 8:
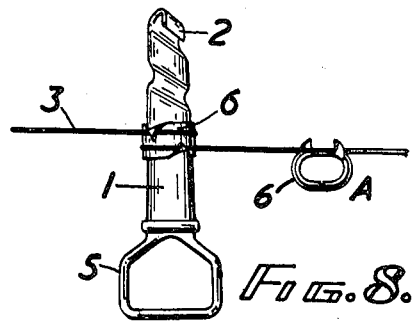

If reference be now had to Figures 5, 6, 7 and 8 the method of operation will be clear. The grooved tip 1 of the tool is hooked on to the connection 1 as shown in Figure 5. The tool is now twisted or rotated by means of the handle 5 and the connection—usually wire—is wound into the spiral and helical groove around the tool and as shown in Figure 6 until a loop is formed and when it reaches the anchoring device the connection leaves the tool and begins to climb on to the anchoring device as shown in Figure 7 and finally the connection leaves the tool altogether and becomes wound around the anchoring device in a position between the lugs 7 as shown in Figure 8. The anchoring device may be positioned on the tool with the aid of a small projection or by reason of a slight taper. It should be wedged on to the tool across its narrower axis, since the pressure of the wire on the ring will be chiefly across the wider axis, tending to push the elliptical ring into more circular shape. The result is that the pressure of the wire facilitates the release of the ring from the tool. The tool can then be withdrawn from the anchoring device leaving it in position as indicated at A in Figure 8. Thus the effective length of the connection between its two ends will be shortened by that length of it which is wound around the anchoring device.

The linear measurement of the loop—which is the length of slack taken up—will, of course, correspond to the peripheral measurement of the anchoring device and in the case of a hand operated tool, without any power amplifying device, this measurement will usually be some three or four inches and if it happens that that is not enough to effect the desired degree of stretching a second or third anchoring device can be applied at different positions along the connection so that the total length of slack taken up can be multiplied to any desired extent. Obviously a set of these appliances of different sizes can be provided and where large anchoring devices are to be used, or where the connection to be tensioned has a low factor of flexibility a power amplifying means can be provided.

The precise formation of the grooves in the tool is not critical and can be varied but my experience is that the groove at the tip of the tool should provide for coupling to the wire at an acute angle, say 30 degrees, and the same pitch may be maintained for one complete turn. It is an advantage if the pitch is sharply decreased (to about 45 degrees) after one complete turn, as the lead-in to the groove at the point of attachment can be formed at the same angle. The effect of this is that the tool can be brought to the wire at an angle of about 45 degrees and immediately turned to an angle of 30 degrees to the wire, thus taking advantage of the "undercut"

shape of the groove 2, which is sufficient to ensure that the wire does not slip out. On completion of one turn, the tool may be moved again to an angle of 45 degrees to the wire, in order that the latter may follow the direction of the groove. This immediately releases the wire from the groove 2 at the original point of coupling, leaving one turn of wire on the tool. From this point onwards, the pitch and depth of the groove should preferably decrease progressively.

In Figures 3 and 4 I have shown the preferred form the anchoring device may take which needs no further description but it may be mentioned that the preferred construction consists of a broad ring of the required shape made from rectangular strip metal the lugs being formed by making angular cuts and folding over the projecting points to form the lugs 7. It is preferable to make the rings of ductile thick metal rather than thinner harder metal. My experience is that if made of the thicker softer metal they tend better to keep to shape and there is the added advantage that when the anchoring device is in situ on the connection the lugs of this softer metal can be pinned down with a pair of pliers to prevent any possible dislocation.

It is to be noted that in some circumstances, i. e. where the flexible connection is of wire that has little flexibility but is stiff and of considerable ductility the tool can be used to effect the object without the use of the anchoring device as experience has shown that, if in such circumstances, the tool is used to form the loop in the wire the loop will not collapse on removal of the tool but will maintain itself—at any rate for a considerable time, owing to the inherent stiffness of the wire.

The foregoing will make clear the broad principle of the invention which is however, capable of much variation within its general concept of a rotary device adapted to be applied to a flexible connection intermediate its fixed ends and by its rotation to take up any slack in, and apply any desired tension to, the connection.

What is claimed is:

1. A wire tensioning appliance of the midwire take-up type comprising in combination a tensioning tool consisting of an elongated tapered body portion, a hook termination to the narrow end of the body portion, said body portion being formed with a spiral groove of increasing diameter proceeding from the hook termination along the body portion, and an anchoring device carried by the tool adjacent to the groove end opposite the hook termination whereby a loop formed in the wire by rotation of the tensioning tool is automatically transferred on to the anchoring device, the said tensioning tool being removable from the anchoring device.

2. A wire tensioning device of the midwire take-up type comprising an elongated body portion formed with axially spaced and spirally oriented grooves for guiding wire wound about said body in engagement with the grooves thereof, a substantially hook-shaped element at one end of said body formed to engage wire to be tensioned and to guide the engaged wire into the body groove next adjacent to the hook element, and anchoring means on the body rotatable in unison therewith and positioned adjacent to the end of the spiral grooves distal from said hook element whereby, upon axial rotation of the body when hooked to said wire, the wire is wound along said spiral grooves and then shifted in wound condition upon said anchoring means.

3. A wire tensioning device of the midwire take-up type comprising a tool having an elongated body formed with a hook-shaped portion at one end and a spiral-shaped peripheral groove proceeding from said hook portion along said body toward the other end thereof, the said hook portion being engageable with the wire to be tensioned and positioned adjacent to one end of said spiral grooves for guiding wire along said groove, anchoring means fitted upon said body rotatable in unison therewith and axially slidable relative to the body for removal of the anchoring means therefrom, the said anchoring means being positioned adjacent to the groove end opposite to the hook portion whereby, upon axial rotation of the body when hooked to said wire, wire is wound along said spiral groove and then shifted on to said anchoring means, the wire loop thus formed remaining on the anchoring means upon removal of the anchoring means from said body, and means coacting with said body for rotating the same about its axis.

4. A tensioning device as defined in claim 3, wherein the groove portion next adjacent to the hook portion forms an acute angle with the body axis, is continued after about one complete turn at a sharply decreased pitch, and is flattened out as to depth adjacent to the anchoring means.

5. A tensioning device as defined in claim 3, wherein the said hook shaped body portion is in form of an undercut groove oriented substantially in alignment with the adjacent end of the spiral groove to form a continuation of said groove.

6. A wire tensioning device of the midwire take-up type comprising a tool having an elongated body formed with a hook-shaped portion at one end and a spiral-shaped peripheral groove proceeding from said hook portion along said body toward the other end thereof, the said hook portion being engageable with the wire to be tensioned and being positioned adjacent to the end of the groove opposite to said hook portion so as to guide wire along said groove, anchoring means fitted upon said body rotatable in unison with the body and axially slidable relative thereto for separation of the body from the anchoring means, the said anchoring means being positioned adjacent to the groove end opposite to the hook portion and including guide and retaining means extending therefrom, said guide and retaining means forming a continuation of said spiral groove whereby, upon axial rotation of the body when hooked to said wire, wire is wound along said spiral grooves and on to the guide and retaining means of said anchoring means, the wire loop thus formed remaining on the anchoring means upon removal of said body from the anchoring means, and means coacting with the body for rotating the latter about its axis thereby winding wire engaged by the hook portion about the body and on to the anchoring means.

7. A tensioning device as defined in claim 6, wherein the said means for rotating the body comprise a handle fixedly secured to the body at the end thereof opposite to the said hook portion.

8. A tensioning device as defined in claim 6, wherein the said body has a non-circular cross-section, and wherein the said anchoring means are in form of a ring member having a non-circular configuration corresponding to the body cross-section, the said guide and retaining means comprising prongs laterally extending from the periphery of said ring member.

9. An anchoring means for use in connection with a wire tensioning device of the midwire take-up type in which an elongated body portion is provided with axially spaced and spirally oriented grooves to guide wire wound about said body into engagement with the grooves therein and a substantially hook-shaped element on one end to guide the engaged wire into the body groove next adjacent to the hook element and in which anchoring means are fitted upon the body adjacent to the groove end opposite to the hook element rotatable in unison with the body and axially slidable relative thereto for removal of the anchoring means from the body whereby, upon axial rotation of the body when hooked to said wire, wire is wound along said spiral groove and then shifted onto said anchoring means, the wire loop thus formed remaining on the anchoring means upon removal of the latter from the body, said anchoring means comprising a generally sleeve-shaped member of non-circular cross-section fittable upon said elongated body and having on its outer wall peripheral outwardly protruding prongs for retaining the wire loop on the sleeve-shaped member.

10. An anchoring means according to claim 9, wherein said prongs extend from opposite ends of said sleeve member and are circumferentially spaced.

References Cited in the file of this patent

UNITED STATES PATENTS

| | | |
|---|---|---|
| 528,194 | Van Wagoner | Oct. 30, 1894 |
| 559,133 | Holden | Apr. 28, 1896 |
| 616,787 | Gunn | Dec. 27, 1898 |
| 907,095 | Stone | Dec. 15, 1908 |
| 1,423,211 | Gushwa | July 18, 1922 |
| 1,498,731 | Hollingsworth | June 24, 1924 |

FOREIGN PATENTS

| | | |
|---|---|---|
| 16,041/28 | Australia | June 5, 1929 |